United States Patent [19]

McGrath et al.

[11] Patent Number: 5,286,320
[45] Date of Patent: Feb. 15, 1994

[54] METHOD FOR MAKING A PULTRUDED PANEL

[75] Inventors: Ralph D. McGrath, Granville, Ohio; J. Gordon Murphy; Peter R. Mitchell, both of Halifax, Canada; Christian C. Koppernaes, Varnville, S.C.

[73] Assignee: Owens-Corning Fiberglas Technology Inc., Summit, Ill.

[21] Appl. No.: 793,750

[22] Filed: Nov. 18, 1991

[51] Int. Cl.⁵ ............... B32B 31/12; B32B 31/26
[52] U.S. Cl. .................... 156/83; 156/79; 156/166; 156/242; 156/245; 264/53; 264/174
[58] Field of Search .......... 156/78, 166, 245, 242, 156/83, 187, 180, 79; 428/314.4; 264/174, 343, 53

[56] References Cited

U.S. PATENT DOCUMENTS

| | | | |
|---|---|---|---|
| 3,157,204 | 11/1964 | Phillips | 156/187 X |
| 3,736,210 | 5/1973 | Kaczerginski | 156/171 X |
| 3,915,783 | 10/1975 | Goppel et al. | 156/245 X |
| 4,042,746 | 8/1977 | Hofer | 428/314,4 X |
| 4,585,683 | 4/1986 | Curnow | 428/71 |
| 4,880,893 | 11/1989 | Waitkus | 528/129 |
| 5,112,663 | 5/1992 | Morenz et al. | 428/314.4 X |
| 5,120,380 | 6/1992 | Strachan | 156/180 X |

FOREIGN PATENT DOCUMENTS

| | | |
|---|---|---|
| 1113673 | 12/1981 | Canada . |
| 1141640 | 2/1983 | Canada . |
| 1262858 | 11/1989 | Canada . |

OTHER PUBLICATIONS

"Dura Shield, Fiberglass Foam Core Building Panels", Morrison Molded Fiberglas Company.
"Foam and syntactic film give core support to composites", *Advanced Composites*, Jan./Feb. 1991.
"Pultrusion and 'Pull-Förming' Of Advanced Composites", by Nolet and Fanucci, at The Design, Manufacture and Quality of Low Cost, Light Weight Advanced Composite Molds, Tools and Structures, Boca Raton, Fla., Oct. 17–18, 1988.
"The Role of the Interface in the Pultrusion Process", by Outwater, 42nd Annual Conference, Composites Institute, Feb. 2–6, 1987.
"Penolic Composites—A Western Europe Up-Date", by Starr, 42nd Annual Conference, Composites Institute, Feb. 2–6, 1987.
"General Information", Chapter 1 of *Handbook of Pultrusion Technology*.

*Primary Examiner*—Michael W. Ball
*Assistant Examiner*—Michele K. Yoder
*Attorney, Agent, or Firm*—Ted C. Gillespie

[57] ABSTRACT

A method for continuously manufacturing a composite sandwich structure by pultrusion through a pultrusion die comprises arranging fiber reinforcement materials on the surface of a preformed foam core, applying liquid resin to the reinforcement materials on the surface of the foam core, heating the surface region of the foam core to a temperature of at least 100° C. to convert water in the foam core to steam, thereby causing water vapor pressure expansion of the foam, and using the expansion of the foam core to subject the liquid resin to increased pressure.

18 Claims, 4 Drawing Sheets

METHOD FOR MAKING A PULTRUDED PANEL

TECHNICAL FIELD

This invention pertains to a manufacturing method for producing building panels. More particularly, this invention pertains to making structural insulated panels having a foam core material and a pultruded rigid resinous skin.

BACKGROUND ART

One of the current methods used to make fiberglass reinforced plastic (FRP) articles is the pultrusion process. The pultrusion process coats or saturates continuous glass fibers or other reinforcement materials and pulls them through a die to form a continuously molded linear part. The glass fibers or other fiber reinforcement within the pultruded FRP material provide good durability, strength and surface properties required of a structural panel. After molding, the part can be sawed off or cut to desired lengths to produce discrete FRP articles. The resins typically used in pultrusion are polyester resins, although other resins such as phenolic, epoxy, or vinylester resins can be used.

The pultrusion processes can be used to make lineal members having varied cross sections. For example, pultrusion can be used to produce vinyl window lineals having complex cross sectional shapes. Another use of pultrusion is to form building panels or structural panels for use in the construction industry. Such panels are often used in transportation facilities, such as airport passageways and subway tunnels.

Some pultrusion products are used for building materials in settings where they are exposed to human beings. Preferably, these products are made from materials which reduce smoke generation in the event of a fire. Such building materials would have an important property of low smoke generation. Phenolic resin is known to have superior properties in reducing smoke generation in fire situations.

In some cases, it is desirable to make a sandwich structural panel having a pultruded FRP exterior and a core material which provides insulation, structural and other properties. A sandwich panel is a combination of thin, high-strength facings on each side of a much thicker, lightweight core material. To that end, some manufacturers of structural panels have taken a hollow pultruded FRP panel and filled the panel with a foamable mixture to create a foam-filled or foam core structural panel having an FRP pultruded skin. Typically, such a foaming process involves a urethane foam.

One of the inherent problems with a post-pultrusion foaming process is that the bond between the foam and the FRP skin is inherently weak, and the entire panel lacks sufficient integrity and strength for most composite building material requirements. A crucial element of a successful sandwich panel is a tough bond between the facing and the core.

Attempts to pultrude an FRP skin onto a preformed foam core board have been largely ineffective. Such attempts have usually employed a polyester resin, which does not have low smoke generation characteristics. One of the major problems of such attempts has been the friability of the foam material when subjected to the pressure of the pultrusion process. Without a significant amount of pressure, the FRP skin will not bond to the foam material. However, the significant pressure required for good bonding of the FRP skin to the foam tends to fracture and otherwise degrade the foam core. Further, the urethane foam materials heretofore used do not provide very good smoke properties during a fire.

Most previous attempts to make FRP skin/foam core sandwich panels were batch processes rather than continuous flow-through pultrusion processes. As a result of the batch-oriented nature of the processes, quality control during large-scale production tended to be very difficult. Such structural panels tended to display significant variations in their mechanical, electrical and surface properties, both from one production run to the next and even within the same production run.

In view of the deficiencies of existing methods for making composite sandwich structural panels, there is a need for a method which can consistently make good quality insulated FRP construction panels having low smoke-generating properties.

DISCLOSURE OF THE INVENTION

There has now been developed a method for manufacturing a composite sandwich structure by pultrusion of a skin of liquid resin and reinforcement materials on the surface of a preformed foam core. As the liquid resin and foam core are pulled through the pultrusion die, the liquid resin and the surface region of the foam core are heated to convert water in the foam core to steam, thereby causing water vapor pressure expansion of the foam core. The pultrusion die constrains the liquid resin so that the expansion of the foam core subjects the liquid resin to increased pressure, thereby forcing the liquid resin to penetrate and wet the reinforcement materials and to partially penetrate the foam core. The increased pressure ensures a good smooth surface on the resin skin when it cures, and ensures a surprisingly effective bond between the resin skin and the foam core. In some cases the bond between the resin skin and the foam core is stronger than the foam core itself. In a preferred embodiment of the invention, the liquid resin is a phenolic resin. The resulting panel from the pultrusion process is lightweight, fire resistant, and has a good R-value. The fact that it has good fire resistance means it has some combination of the following properties: low smoke, low flame, low release of toxic gases, and low heat release rate.

In a specific embodiment of the invention, the expansion of the foam core causes the liquid resin to be subjected to an apparent laminate pressure of at least 10 psi (69 kPa).

In another specific embodiment of the invention, the expansion of the foam core causes the liquid resin to be subjected to an apparent laminate pressure averaging at least 10 psi (69 kPa) while the resin is curing.

Preferably, the foam core is a phenolic foam core, and the preferred density of the foam core is within the range of from about 28 to about 100 kg/m³. It has been found that phenolic foams preferably contain sufficient water to result in the generation of steam or vapor upon the application of enough heat. Ideally, the foam core contains about 1½ to about 3 percent by weight moisture. Most preferably, the foam core has a bursting pressure greater than about 10 psi (69 kPa). This enables the foam core to withstand the pressures needed during the pultrusion process to produce a good, smooth resin skin surface, and to ensure good bonding between the resin skin and the foam core.

In yet another specific embodiment of the invention, the surface region of the foam core is heated to a temperature of at least 150° C.

According to this invention, there is provided a method of continuously manufacturing a composite sandwich structure by pultrusion through a pultrusion die comprising arranging fiber reinforcement materials on the surface of a preformed foam core, applying liquid resin to the reinforcement materials on the surface of the foam core, heating the surface region of the foam core to a temperature of at least 100° C., constraining the liquid resin so that it partially penetrates the foam core, curing the resin, and cooling the surface region of the foam core to a temperature below 100° C. while the composite sandwich is still constrained by the die. As a practical matter, the temperature of the foam core must be elevated to be at least equal to the saturation temperature for water at the existing pressure to which the foam core is subjected.

In a specific embodiment of the invention, the surface region of the foam core is heated to a temperature of at least 150° C., and the cooling step cools the surface region of the foam core to a temperature below 100° C. while the composite sandwich is still constrained by the die. By constraining the composite sandwich until the surface region of the foam core is cooled to a temperature below 100° C., the steam can be condensed, the expansion forces can be reduced, and the possibility of causing explosive damage to the foam core can be avoided.

BEST MODE OF CARRYING OUT THE INVENTION

Figure 1:
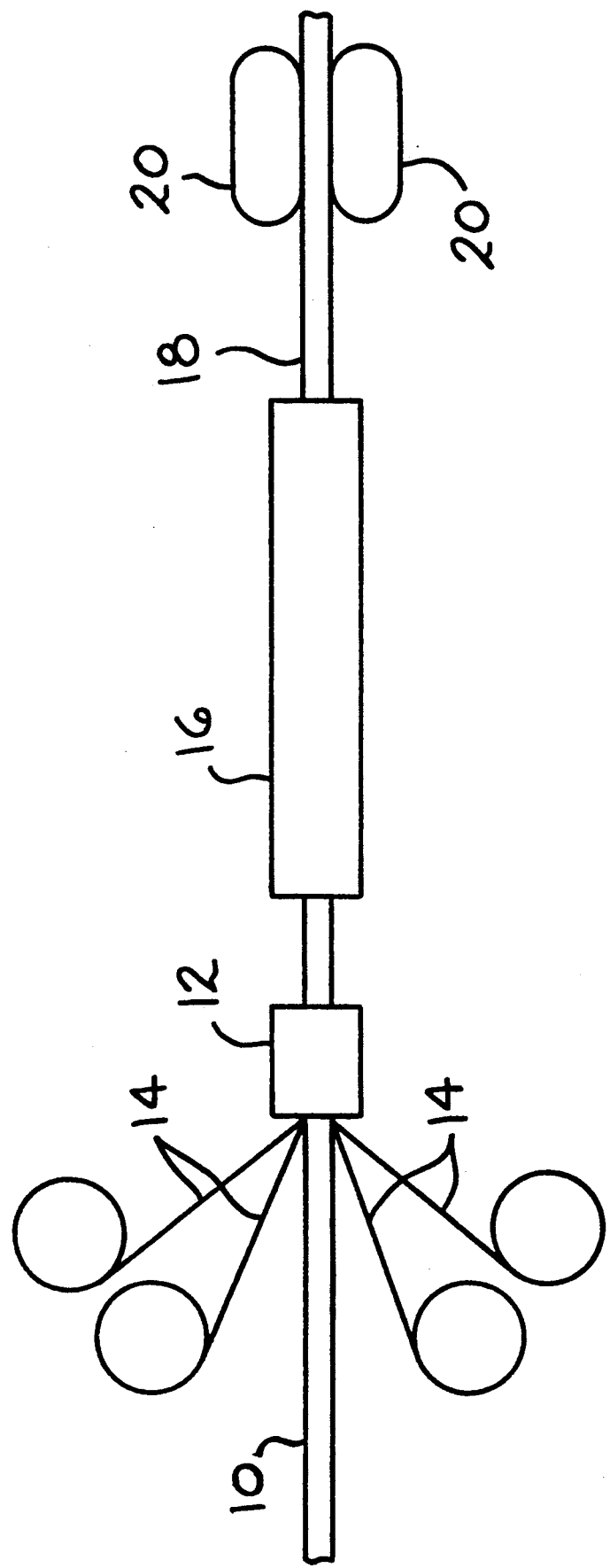
FIG. 1 is a schematic view in elevation of apparatus for making pultruded panels according to the method of the invention.

As shown in FIG. 1, foam core board feedstock 10 is supplied to preforming guide 12 before entering the pultrusion process. The foam coreboard is preferably a phenolic foam, and ideally has a bursting pressure of at least 10 psi (69 kPa) as well as comparatively low water absorption and high resiliency. Most preferably, the foam is an aged phenolic foam having a density within the range from about 2.0 pounds per cubic foot (pcf) (32 kg/m$^3$) to about 3.0 pcf (48 kg/m$^3$). The foam cells must contain sufficient water or other vaporizable material in order to provide the expansion needed to generate the continuous pressure on the phenolic resin of the skin during the curing process.

Reinforcements, such as glass fiber mats and continuous glass fibers 14, are added to the outside surface of the foam core as the foam core passes through the preforming die. The reinforcements can also be already positioned on or in the foam. The reinforcements can comprise any combination of rovings, mats, woven fabrics, or veils composed of such fibers as glass fibers, aramid fibers, carbon fibers, graphite fibers and ceramic fibers to obtain the desired structural and mechanical properties of the skin.

Upon leaving the preforming guide, the foam core and fiber reinforcements are pulled through pultrusion die 16 where the liquid resin is applied and cured to form a resin skin. The resulting cured composite structure, which is indicated as panel 18, is pulled by any suitable traction or pulling device, such as traction drive 20. Subsequently, the cured panel can be sawed off by any suitable means, not shown, into individual panels.

Figure 2:
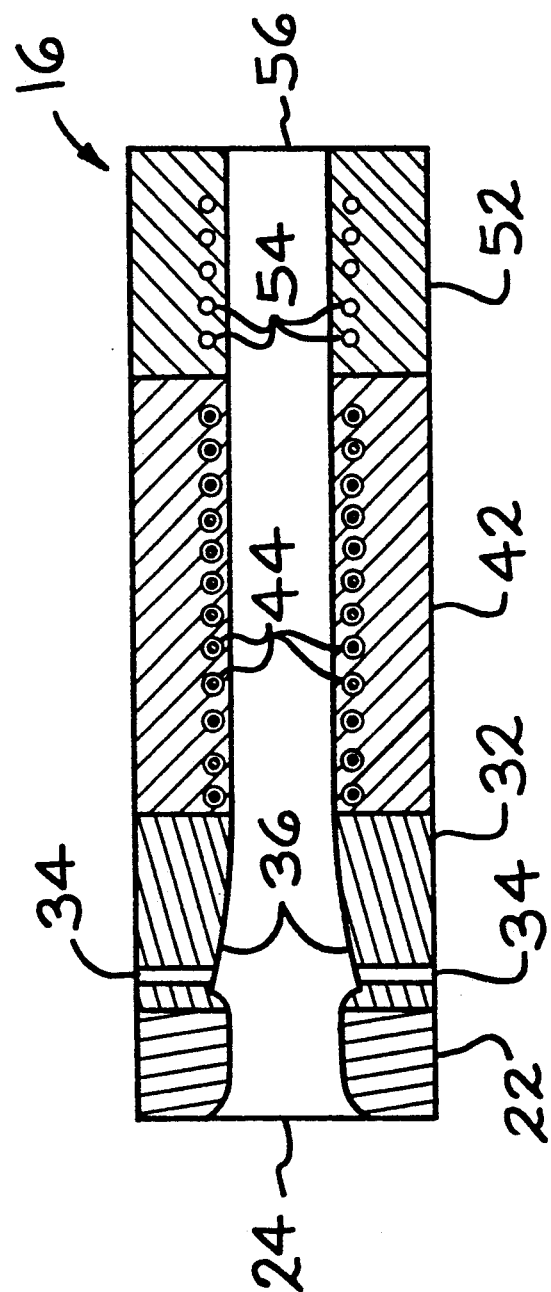
FIG. 2 is a sectional schematic view of the pultrusion die for use in the method of the invention.

As shown in FIG. 2, the pultrusion die is comprised of four zones. First is a compression zone which compresses the reinforcements and the foam core in order to prevent backflow or leaking of the liquid resin from inlet 24 of the pultrusion die. The die can be manufactured from any suitable material, such as steel, as would be well known to those familiar with the pultrusion art. The interior surfaces of the pultrusion die are contoured in such as manner as to define the finished dimensions and surface profile of the panel.

The second zone of the die is resin injection zone 32 during which the liquid resin is applied through resin ports 34. The liquid resin can be any thermosetting phenolic resole or novolac type resin. The resin must be capable of curing to form a smooth skin and a hard finish on the finished panel. The preferred resin is a phenolic resin, although other resins such as polyesters and epoxies can be used. Accelerating agents, compatabilizing agents, fillers, mold release agents, second phases for toughening, and coloring agents can be added to the resin, as will be appreciated by those skilled in the art. An alternative method, such as a wet bath, can be used to apply the resin.

Phenolic resins have proven to be more difficult to pultrude than the more commonly used matrix systems. The material is comparatively viscous at room temperature. This complicates impregnating the reinforcing fibers with resin. Therefore, the die is preferably preheated before the resin injection takes place. Also, the resin itself is preheated in order to lower the viscosity. The resin is injected at high pressure for good wetting of the reinforcement fibers, preferably within the range of from about 2 psi (13.8 kPa) to about 40 psi (276 kPa).

Phenolic resins release large amounts of water as they undergo a condensation reaction during cure. Steps must be taken to minimize the formation of voids as the resin gels and to deal with the volume change of the composite as the chemical reactions progress. A preferred phenolic resin system is a non-acid catalyzed system containing between 5 and 40 percent by weight of polyalkylene glycol, as disclosed in U.S. Pat. No. 4,880,893. Most preferably, the resin is a condensation-type resin which has a high solids content and which has essentially a neutral pH. Curing is effected by a direct condensation reaction at elevated temperature without using an acid catalyst.

The inner surface of the resin injection zone is adapted with recesses 36 which enable the liquid resin to completely coat and wet the reinforcement fibers and the surface of the foam coreboard. As the foam coreboard, the reinforcement fibers, and the liquid resin pass through curing zone 42, the temperature increases and the liquid resin begins to cure. The curing zone is adapted with electric heating coils 44 or any other suitable means, such as hot oil, for maintaining the curing zone at an elevated temperature.

As the foam core passes through the curing zone, the increase in temperature causes some of the water in the foam core cells to vaporize and thereby expand the foam core. This is particularly evident in the surface region of the foam coreboard, where the effect of the temperature increase is most pronounced. The surface region of the foam core is the layer of the foam core closest to the bottom or top face of the core, approximately 5 to 10 mm in depth from the actual surface of the foam core.

The temperature of the surface region can be measured by embedding a thermocouple in the surface region of a foam coreboard and passing it through the pultrusion equipment according to the principles of the invention. For example, a 40 gauge Type T (Copper Constantan) thermocouple made by Omega Engineering Inc., Stamford, Conn., was embedded into the surface of a 4 cm thick foam coreboard so that the upper surface of the thermocouple was approximately 5 mm below the surface of the foam coreboard. As the thermocouple passed through the pultrusion die, it indicated the temperature of the surface region of the foam coreboard.

A practical method for monitoring the pultrusion process is to measure the temperature of the mold itself. The thermocouple can be embedded in the body of the pultrusion mold to avoid distortion of the readings by surface (of the mold) phenomena. For example, in a metal mold, the top of which has a thickness of ¾ inch (19 mm), the termocouple can be buried or embedded ½ inch (13 mm) from the top surface of the mold, and the thermocouple would be about ¼ inch (6 mm) from the bottom surface of the mold.

The effect of the expansion of the foam core, particularly in the surface region of the foam core, is that the liquid resin is squeezed against the inner surface of the die, particularly in the curing zone. Typically, resins used in pultrusion contract or shrink during curing. This results, in many cases, in a pitted or unsmooth surface in the finished product. Further, this shrinkage means that a good bond is not formed between the resin skin and the core material. However, when the heat of the curing zone is used to expand the core material through water vapor expansion, the pressure on the curing liquid resin is maintained so that a good bond is formed between the resin skin and the core material, and so that a good smooth surface is formed on the resin skin. In effect, the expansion of the foam core compensates for the shrinking of the resin skin. The apparent laminate pressure is the net pressure generated on the surface of the foam by mechanical squeezing properties of the die, resin shrinkage during curing, hydrostatic resin pressure, and the expansion or contraction of the foam core due to thermal or vapor expansion effects. The apparent laminate pressure can be measured by passing a force-sensing resistor through the die at the foam/skin interface. A suitable sensor is a CMS500 Polymeric Force Sensing Resistor by American Composite Technology, Boston, Mass.

Figure 5:
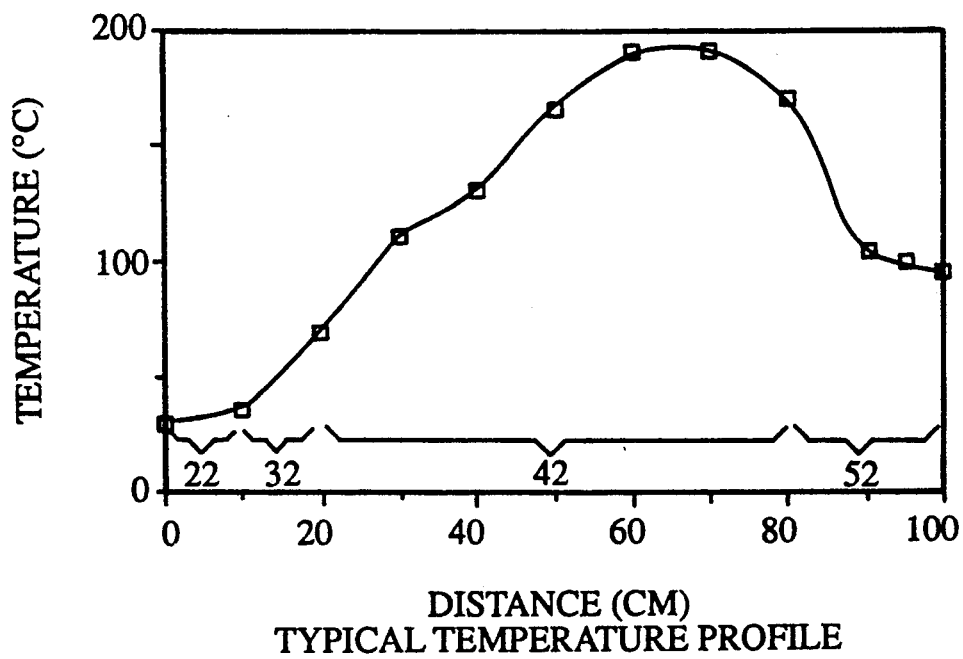
FIG. 5 is a graph indicating the temperature of the surface region of the foam core as the core passes through the pultrusion die in a typical process.

It is believed that the beneficial effect of the expansion of the foam core through heating and vaporization of water can be obtained with temperatures as low as 100° C., although the temperature must at least equal the saturation temperature for water at the existing pressure to which the foam core is subjected. As shown in FIG. 5, the temperature varies as the foam core passes through the die. Preferably, the temperature of the surface region of the foam core is elevated to at least 150° C., in order to provide optimal steam expansion of the foam core for the best bonding of the resin skin to the foam core. Maximum temperatures in the range of 160° C. to 190° C. are typically used. The pressure of the steam expansion forces the resin to penetrate the outer layers of the cells of the foam core, thereby insuring a strong interface between the foam core and the skin. This reduces the possibility of delamination of the finished product.

It should be understood that some penetration of the foam cells by the liquid resin may occur without the water vapor pressure expansion, and that some of the foam cells on the surface of the foam core may be already ruptured, but the increased pressure on the liquid resin caused by the water vapor expansion forces the liquid resin to further penetrate and wet the reinforcement material and the foam core cells. For purposes of this invention, the term "liquid resin" also includes the resin in a gelled state.

As the cured or nearly cured panel passes through cooling zone 52, the temperature of the resin skin and surface region of the panel are greatly reduced. The cooling zone can be adapted with water ports 54, or any other suitable means, for providing a cooling effect to the panel. If the hot panel were allowed to emerge directly from the curing zone, the loss of support from the die surfaces would permit the steam within the core to expand explosively, severely damaging the panel and rendering consistent panel quality difficult. The cooling zone is employed to cool the panel and reduce the steam pressure within the foam core prior to the point where the panel passes through outlet 56. The combination of the cooling zone and the comparatively high bursting pressure, preferably at least 10 psi (69 kPa), effectively prevents steam pressure related damage to the panel.

Figure 3:
FIG. 3 is a partial sectional view in elevation of the pultruded phenolic foam panel with a phenolic resin skin according to the method of the invention.

As shown in FIG. 3, the partial section of the cured panel includes phenolic resin skin 60 and the foam core 10. Surface region 62 of the foam core is near the top of the foam core. It can be seen that the resin penetrates approximately the top two to four layers of cells of the foam core.

Figure 4:
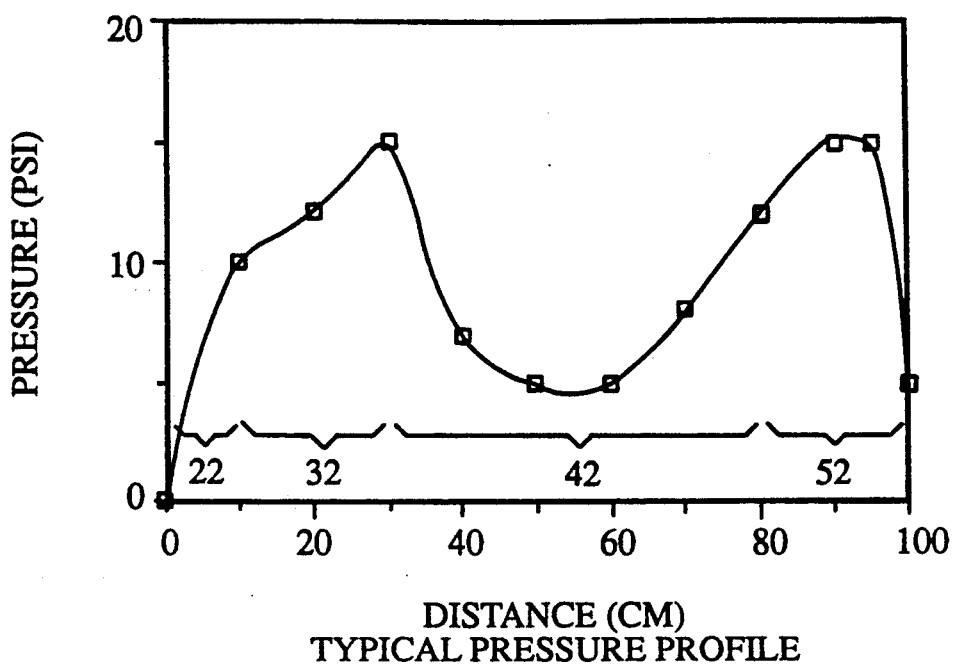
FIG. 4 is a graph indicating the apparent laminate pressure on the fiber reinforced phenolic resin skin during a typical pultrusion process.

As can be seen in FIG. 4, the apparent laminate pressure experienced by the panel increases as the panel moves from compression zone 22 to resin injection zone 32. As the panel passes through the curing zone 42 the apparent laminate pressure initially drops due to shrinkage of the resin skin as it begins to cure. In the latter part of the curing zone the apparent laminate pressure greatly increases due to the steam expansion of the water in the foam. The apparent laminate pressure is maintained throughout the entire passage of the panel through cooling zone 52.

As shown in FIG. 5, the temperature of the surface region of the foam core begins to increase as the core travels from the compression zone into the resin injection zone. During the curing zone, the temperature increases greatly due to the heat of the electric heating coils and the heat released by the exothermic curing reaction of the resin. The temperature is greatly reduced, to a level below 100° C., as the panel passes through cooling zone 52. By comparing FIGS. 4 and 5, it can be seen that the apparent laminate pressure on the resin skin in the cooling zone is maintained until the temperature of the surface region is reduced to below about 100° C.

EXAMPLE

A phenolic foam boardstock was supplied to a pultrusion die. The phenolic foam had a density of 2.5 pcf (40 kg/m³) and the cross-sectional area was 1⅝ inches thick (4 cm) by one foot wide (30 cm). The surface of the foam coreboard was reinforced with a Vectorply V1808 reinforcing fiberglass mat having a weight of 25 oz/yd² (850 gr/m²) manufactured by Bean Fiberglass, Jeffries, N.H., and approximately 20 continuous fiberglass strands of bulk roving, each roving of 5000 Tex (5 gm/m) yield. The coreboard and reinforcements were pulled through the pultrusion die at a speed of approximately one foot per minute (0.3 meters per minute).

In the resin injection zone a non-acid catalyzed phenolic resin was injected at a temperature of about 120° C. During the curing of the phenolic resin skin the maximum temperature of the surface region of the foam core reached 167° C. By the time foam core reached the outlet of the pultrusion die, the temperature of the surface region of the foam core had been reduced to 95° C.

The resulting continuous panel was cut into lengths, and the interface shear strength of the bond between the skin and the foam core was 18.5 psi (128 kPa) as measured by ASTM Test C-273-61. The R-value of the panel was measured to be 8.3/inch.

The resinous skin without any foam core is known to have flame and smoke properties (Using ASTM E84) as follows: Flame—13 or less; Smoke—16 or less. It is presumed that the flame and smoke of the panel would be nearly equivalent. The foam core by itself has flame and smoke properties (using ULC S102 Canadian) as follows: Flame—25 or less; Smoke—30 or less.

Photomicrographs of the skin and upper area of the phenolic panel showed that the skin thickness was about 1/32 of an inch 0.8 mm). Approximately three layers of the phenolic foam cells were damaged during the pultrusion process, and were consequently either partially or entirely filled with the phenolic resin skin. The thickness of the damaged cells constituted about 10 percent of the thickness of the skin. The thickness of the damaged cells constituted about one percent of the thickness of the coreboard. The remaining cells of the foam coreboard appeared generally undamaged.

It will be evident from the foregoing that various modifications can be made to this invention. Such, however, are considered as being within the scope of the invention.

INDUSTRIAL APPLICABILITY

This invention will be useful in making construction panels, particularly of the type producing low smoke generation during a fire.

We claim:

1. A method of continuously manufacturing a composite sandwich structure by pultrusion through a pultrusion die comprising:
   arranging fiber reinforcement materials on the surface of a preformed closed cell foam core having a bursting pressure greater than about 10 psi (69 kPa);
   moving the foam core through the pultrusion die;
   applying liquid resin to the reinforcement materials on the surface of the foam core;
   heating the surface region of the foam core to a temperature of at least 100° C. to convert water in the foam core to steam, thereby causing water vapor pressure expansion of the foam core and rupture of the foam cells on the surface of the foam core;
   constraining the liquid resin so that the expansion of the foam core subjects the liquid resin to increased pressure, thereby forcing the liquid resin to penetrate and wet the reinforcement materials and to partially penetrate the foam core; and,
   curing the resin.

2. The method of claim 1 in which the expansion of the foam core causes the liquid resin to be subjected to an apparent laminate pressure of at least 10 psi (69 kPa).

3. The method of claim 2 in which the expansion of the foam core causes the liquid resin to be subjected to an apparent laminate pressure averaging at least 10 psi (69 kPa) while the resin is curing.

4. The method of claim 2 in which the foam core is a phenolic foam.

5. The method of claim 4 in which the foam core has an overall density within the range of from about 28 to about 100 kg/m³.

6. The method of claim 5 in which the liquid resin is a phenolic resin.

7. The method of claim 6 in which the surface region of the foam core is heated to a temperature of at least 150° C.

8. The method of claim 1 in which the surface region of the foam core is heated to a temperature at least equal to the saturation temperature for water.

9. A method of continuously manufacturing a composite sandwich structure by pultrusion through a pultrusion die comprising:
   arranging the fiber reinforcement materials on the surface of a preformed closed cell foam core having a bursting pressure greater than about 10 psi (69 kPa);
   moving the foam core through the pultrusion die;
   applying liquid resin to the reinforcement materials on the surface of the foam core;
   heating the surface region of the foam core to a temperature of at least 100° C. to convert water in the surface region of the foam core to steam, thereby causing water vapor pressure expansion of the foam core and rupture of the foam cells on the surface of the foam core;
   constraining the liquid resin so that the expansion of the foam core subjects the liquid resin to increased pressure, thereby forcing the liquid resin to penetrate and wet the reinforcement materials and to partially penetrate the foam core;
   curing the resin; and
   cooling the surface of the foam core to a temperature below 100° C. while the composite sandwich is still constrained by the die.

10. The method of claim 9 in which the expansion of the foam core causes the liquid resin to be subjected to an apparent laminate pressure of at least 10 psi (69 kPa).

11. The method of claim 10 in which the expansion of the foam core causes the liquid resin to be subjected to an apparent laminate pressure averaging at least 10 psi (69 kPa) while the resin is curing.

12. The method of claim 9 in which the foam core is a phenolic foam.

13. The method of claim 12 in which the foam core has an overall aged density within the range of from about 28 to about 100 kg/m³.

14. The method of claim 13 in which the foam core has a compressive strength greater than about 10 psi (69 kPa).

15. The method of claim 14 in which the liquid resin is a phenolic resin.

16. The method of claim 15 in which the surface region of the foam core is heated to a temperature of at least 150° C., and the cooling step cools the surface region of the foam core to a temperature below 100° C. while the composite sandwich is still constrained by the die.

17. The method of claim 9 in which the surface region of the foam core is heated to a temperature equal to the saturation temperature of water in the foam core, and the cooling step cools the foam core to a temperature below 100° C. while the composite sandwich is still constrained by the die.

18. A method of continuously manufacturing a composite sandwich structure by pultrusion through a pultrusion die comprising:

arranging fiber reinforcement materials on the surface of a preformed closed cell foam core having a bursting pressure greater than about 10 psi (69 kPa);

moving the foam core through the pultrusion die;

applying liquid resin to the reinforcement materials on the surface of the foam core;

heating the surface region of the foam core to a temperature of at least the saturation temperature of water to convert water in the foam core to steam, thereby causing water vapor pressure expansion of the foam core and rupture of the foam cells on the surface of the foam core;

constraining the liquid resin so that the expansion of the foam core subjects the liquid resin to increased pressure, thereby forcing the liquid resin to penetrate and wet the reinforcement materials and to partially penetrate the foam core;

curing the resin; and, cooling the surface region of the foam core to a temperature below the saturation temperature of water while the composite sandwich is still constrained by the die.

* * * * *